(12) United States Patent
Chan et al.

(10) Patent No.: US 8,121,969 B2
(45) Date of Patent: Feb. 21, 2012

(54) INTERPRETING A PLURALITY OF M-DIMENSIONAL ATTRIBUTE VECTORS ASSIGNED TO A PLURALITY OF LOCATIONS IN AN N-DIMENSIONAL INTERPRETATION SPACE

(75) Inventors: Chung-King Chan, Sugar Land, TX (US); Stephane Gesbert, Rijswijk (NL); Albert Ronald Masters, Sugar Land, TX (US); Chunbao Xu, Katy, TX (US)

(73) Assignee: Shell Oil Company, Houston, TX (US)

( * ) Notice: Subject to any disclaimer, the term of this patent is extended or adjusted under 35 U.S.C. 154(b) by 538 days.

(21) Appl. No.: 12/438,902

(22) PCT Filed: Aug. 29, 2007

(86) PCT No.: PCT/EP2007/058971
§ 371 (c)(1),
(2), (4) Date: Feb. 25, 2009

(87) PCT Pub. No.: WO2008/025786
PCT Pub. Date: Mar. 6, 2008

(65) Prior Publication Data
US 2010/0017354 A1 Jan. 21, 2010

(30) Foreign Application Priority Data
Aug. 31, 2006 (EP) .................................. 06119911

(51) Int. Cl.
*G06F 17/00* (2006.01)
*G06N 5/02* (2006.01)
(52) U.S. Cl. ........................................................ 706/47
(58) Field of Classification Search ................. 706/47
See application file for complete search history.

(56) References Cited

U.S. PATENT DOCUMENTS
6,236,942 B1 5/2001 Bush ................................ 702/14
(Continued)

FOREIGN PATENT DOCUMENTS
EP 903592 3/1999

OTHER PUBLICATIONS

A feature dependent method for opinion mining and classification, Balahur, A.; Montoyo, A.; Natural Language Processing and Knowledge Engineering, 2008. NLP-KE '08. International Conference on Digital Object Identifier: 10.1109/NLPKE.2008.4906796 Publication Year: 2008 , pp. 1-7.*

(Continued)

*Primary Examiner* — Michael B Holmes (57) ABSTRACT

A method for interpreting a plurality of m-dimensional attribute vectors (m2) assigned to a plurality of locations in an n-dimensional interpretation space (n1), which method comprises arranging at least a subset of the attribute vectors as points in an m-dimensional attribute space; defining k classes (k2) of attribute vectors by identifying for each class at least one classification point in attribute space; postulating a classification rule for points in attribute space; determining a class-membership attribute of a point in attribute space using the classification points and the classification rule to obtain a classified point; and assigning a display parameter to the classified point which is related to the class-membership attribute. In one embodiment the display parameter is a mixed display parameter derived from probabilistic membership values each representing a probability that the classified point belongs to a selected class. In another embodiment classified points are displayed in attribute space and in interpretation space at the same time. The method can be used in a method of producing hydrocarbons from a subsurface formation. Also provided are corresponding computer program products and computer systems.

17 Claims, 5 Drawing Sheets

U.S. PATENT DOCUMENTS

| | | | | |
|---|---|---|---|---|
| 6,747,643 | B2 * | 6/2004 | Happel | 345/419 |
| 7,054,757 | B2 * | 5/2006 | Agrafiotis et al. | 702/19 |
| 7,139,739 | B2 * | 11/2006 | Agrafiotis et al. | 706/20 |
| 7,908,619 | B2 * | 3/2011 | Yoshida et al. | 725/46 |

OTHER PUBLICATIONS

Web opinion mining based on sentiment phrase classification vector, Pengcheng Han; Junping Du; Liping Chen; Network Infrastructure and Digital Content, 2010 2nd IEEE International Conference on Digital Object Identifier: 10.1109/ICNIDC.2010.5657968 Publication Year: 2010 , pp. 308-312.*

Aminzadeh Fred: Pattern Recognition and Image Processing, 1987, Geophysical Press, London, pp. 1-44, p. 381, pp. 365-369, XP002416304.

Brenton P., et al: When Geology meets Geophysics, Eage $68^{th}$ Conf. & Exhibition, Jun. 12, 2006, pp. 1-5 XP002414504.

Chopra S., et al: Successful AVO and Cross-plotting, GSEG Recorder, Nov. 2003, pp. 5-11 XP002414503.

Bacon M., et al: 3-D Seismic Interpretation 2003, Cambridge, pp. 71-88, pp. 112-113, p. 120, pp. 130-138 XP002416425.

Houlding Simon W.: 3D Geoscience Modeling, Computer Techniques for Geological Characterization, 1994, pp. 14-23, pp. 40-69, pp. 112-123, Springer XP002416426.

* cited by examiner

INTERPRETING A PLURALITY OF M-DIMENSIONAL ATTRIBUTE VECTORS ASSIGNED TO A PLURALITY OF LOCATIONS IN AN N-DIMENSIONAL INTERPRETATION SPACE

PRIORITY CLAIM

The present application claims priority from PCT Application PCT\EP2007/058971, filed 29 Aug. 2007, which in turn claims priority from European Patent Application 06119911.3 filed 31 Aug. 2006.

FIELD OF THE INVENTION

The present invention relates to a method for interpreting a plurality of m-dimensional attribute vectors ($m \geq 2$) assigned to a plurality of locations in an n-dimensional interpretation space ($n \geq 1$). The interpretation space can in particular represent a subsurface formation. The invention can be used in a method of producing hydrocarbons from a subsurface formation.

BACKGROUND OF THE INVENTION

The interpretation of a large amount of data obtained for an interpretation space can be a very complex task. A particular example is the analysis of seismic and sometimes other data obtained for a subsurface formation, in order to allow discrimination among regions and layers of particular properties. The expression 'subsurface formation' is used herein to refer to a volume of the subsurface. A volume of the subsurface typically contains a plurality of layers. The subsurface formation can in particular include one or more layers containing or thought to contain hydrocarbons such as oil or natural gas, but it can also and even predominantly include other layers and geological structures.

Frequently, two or more data sets are available, each providing values of a distinct scalar parameter for different locations throughout the interpretation space. It is desired to interpret these data sets in conjunction so as to identify certain classes of regions in the interpretation space.

In the case of interpreting data obtained for a subsurface formation, so-called Amplitude Variations with Offset (AVO) technology is frequently applied. In the article "Successful AVO and Cross-Plotting" by S. Chopra, V. Alexeev and Y. Xu, GSEG Recorder, November 2003, p. 5-11, cross-plotting is discussed as a technique enabling simultaneous and meaningful evaluation of two attributes. In conventional cross-plotting, the values of two separate scalar parameters (attributes) belonging to a particular location in the interpretation space (in the subsurface formation) are plotted as a point in a separate two-dimensional space which can be referred to as attribute space. The two dimensions of the attribute space represent the two attributes considered.

In Example 1 of the Chopra article, the interpretation space is 1-dimensional along the trajectory of a wellbore through a subsurface formation. Along the wellbore, several well-log parameters (attributes) have been measured or derived from measurements, e.g. P-velocity $V_p$, S-velocity $V_s$, Rho, Mu, and Lambda (the Lamé parameters, representing respectively the bulk density, the shear modulus, and the compressional influence on the elastic moduli). 2-dimensional cross-plots of $V_p$ vs. $V_s$, Lambda-Rho vs. Mu-Rho are presented, and also two cross-plots in which a three-dimensional attribute space was used. Geologic layers are identified along the wellbore, and in the cross-plot the points representing data from a specific type of geologic layer are plotted with a specific colour. In the cross-plot, clusters of points having mainly or exclusively the same colour can be seen. Conversely, by drawing a polygon around each of the clusters the operator can mark log zones along the well from which these data points originated.

A particular embodiment of the polygon method is discussed in a paper by P. Brenton and O. D. Duplantier "When Geology meets Geophysics—optimised Lithoseismic Facies Cubes for Reservoir Needs", EAGE $68^{th}$ Conference & Exhibition—Vienna, Austria, 12-15 Jun. 2006. In this paper, polygons drawn to separate facies groups in a cross-plot of log data are updated using petrophysical data. The occurrence probability of certain petrophysical parameters such porosity in certain facies or groups of facies is statistically analysed, and used to refine the facies group definition by polygon boundaries in the cross-plot. After the refined polygons have been determined, a 3D visualization of the result in interpretation space is done by the geologist.

There is a need for an improved interpretation method. In complex situations, such as when the distributions of the various classes are under-sampled or overlapping, and in particular when no or only few petrophysical data are available, the operator cannot confidently draw the polygons to distinguish among several classes of data. Also, when considering an attribute space with three or even more dimensions, the polygon method is insufficient.

It will be understood, that vector data can be considered as an assembly of scalar data, in particular scalar datasets for a corresponding plurality of locations. In particular, attribute vectors can always be considered to represent an assembly of co-located scalar datasets.

SUMMARY OF THE INVENTION

In accordance with the invention there is provided a method for interpreting a plurality of m-dimensional attribute vectors ($m \geq 2$) assigned to a plurality of locations in an n-dimensional interpretation space ($n \geq 1$), which method comprises the steps of arranging at least a subset of the attribute vectors as points in an m-dimensional attribute space;

defining k classes ($k \geq 2$) of attribute vectors by identifying for each class at least one classification point in attribute space;

postulating a classification rule for points in attribute space;

determining a class-membership attribute of a classified point in attribute space using the classification points and the classification rule to obtain a classified point, wherein the class-membership attribute of the classified point comprises k probabilistic membership values, each representing a probability that the classified point belongs to a selected one of the k classes; and assigning a display parameter to the classified point that related to the class-membership attribute, wherein the display parameter is a mixed display parameter derived from the probabilistic membership values.

In the method of the invention, k classes are defined through classification points in attribute space. One or more such classification points per class are identified in the attribute space. Depending on the information available to the operator, the identification can be done by a selection directly in attribute space, or by identifying a location in interpretation space that is known or expected to belong to a particular class. In the latter case, the attribute vector belonging to the selected location is thereby identified as the classification point needed to define the particular class.

Once this definition of classes is completed, a class-membership attribute is determined for each classified point, on the basis of the identified classification points, and of a classification rule that has been postulated for points in space, typically for any point in the attribute space considered.

In a particular embodiment of the method, defining a class comprises assigning a probability density function to the class, so that the class-membership attribute of the classified point can be determined from the probability density functions of the classes. The probability density function indicates the probability that a point in attribute space belongs to a given class. More in particular, the class-membership attribute of the classified point comprises k probabilistic membership values each representing a probability that the classified point belongs to one of the classes given the attribute values at that point.

Once an initial classification of points in attribute space has been obtained, an operator can update (adapt or "fine-tune") the definition of classes, in particular interactively, in one or more iterations, wherein the updating in a next iteration is done in response to the result obtained from one or more previous iterations. Updating can be done by revising earlier choices, or by applying an algorithm such as Expectation-Maximization or K-means, as for example described in M. W. Mak, S. Y. Kung, S. H. Lin; "Expectation-Maximization Theory", Biometric Authentication: A Machine Learning Approach, Prentice-Hall, 2004.

On the basis of the class-membership attribute, a display parameter is assigned to each of the points in attribute space. The mixed ("blended") display parameter can in particular be a mixed colour. Suitably, a k-dimensional attribute-to-colour map or table is used for displaying at least part of the interpretation space and/or attribute space.

Suitably at least part of the attribute space is displayed together with displaying at least part of the interpretation space. Displaying the classified points in attribute space and at least in part of the interpretation space at the same time, using the mixed display parameter, on one or more computer displays, allows in particular to update the definition of classes in response to the display interactively.

In a further aspect of the invention there is provided a method for interpreting a plurality of m-dimensional attribute vectors (m≧2) assigned to a plurality of locations in an n-dimensional interpretation space (n≧1), which method comprises the steps of arranging at least a subset of the attribute vectors as points in an m-dimensional attribute space;

defining k classes (k≧2) of attribute vectors by identifying for each class at least one classification point in attribute space;

postulating a classification rule for points in attribute space;

determining a class-membership attribute of a classified point in attribute space using the classification points and the classification rule;

assigning a display parameter to the classified point which is related to the class-membership attribute; and displaying the classified points in attribute space and at least in part of the interpretation space at the same time, using the display parameter, on one or more computer displays.

The simultaneous display of attribute space and at least part of the interpretation space allows the beneficial interactive updating of the classification by an operator of the method. The number of classes as well as classification points can be adapted using both interpretation and attribute spaces. Classification rules can also be adapted and the results are immediately visible.

In a particular embodiment, defining a class comprises assigning a probability density function to the class, so that the class-membership attribute of the classified point can be determined from the probability density functions of the classes. More in particular, the class-membership attribute of the classified point comprises k probabilistic membership values each representing a probability that the classified point belongs to one of the classes given the attribute values at that point.

In another embodiment, the class-membership attribute of the classified point is determined from the location of the classified point with respect to the classification points, for example on the basis of the distance in attribute space from the classified point to the various classification points.

The invention also provides a computer program product for interpreting a plurality of m-dimensional attribute vectors (m≧2) assigned to a plurality of locations in an n-dimensional interpretation space (n≧1), which computer program product comprises computer program code means for arranging at least a subset of the attribute vectors as points in an m-dimensional attribute space;

computer program code means for defining k classes (k≧2) of attribute vectors by identifying for each class at least one classification point in attribute space;

computer program code means for postulating a classification rule for points in attribute space;

computer program code means for determining a class-membership attribute of a point in attribute space using the classification points and the classification rule to obtain a classified point, wherein the class-membership attribute of the classified point comprises k probabilistic membership values, each representing a probability that the classified point belongs to a selected one of the k classes; and computer program code means for assigning a display parameter to the classified point which is related to the class-membership attribute, wherein the display parameter is a mixed display parameter derived from the probabilistic membership values.

The invention moreover provides a computer program product for interpreting a plurality of m-dimensional attribute vectors (m≧2) assigned to a plurality of locations in an n-dimensional interpretation space (n≧1), which method comprises the steps of computer program code means for arranging at least a subset of the attribute vectors as points in an m-dimensional attribute space;

computer program code means for defining k classes (k≧2) of attribute vectors by identifying for each class at least one classification point in attribute space;

computer program code means for postulating a classification rule for points in attribute space;

computer program code means for determining a class-membership attribute of a classified point in attribute space using the classification points and the classification rule;

computer program code means for assigning a display parameter to the classified point which is related to the class-membership attribute; and computer program code means for displaying the classified points in attribute space and at least in part of the interpretation space at the same time, using the display parameter, on one or more computer displays.

There is furthermore provided a computer system executing any one of these computer program products.

The invention also provides a method of producing hydrocarbons from a subsurface formation, comprising obtaining a plurality of m-dimensional attribute vectors ($m \geq 2$) for a plurality of locations in an interpretation space representing the subsurface formation, each attribute vector characterizing at least two parameters of the subsurface formation at the respective location;

interpreting the plurality of attribute vectors according to the method of interpreting a plurality of attribute vectors of the present invention;

identifying a region in the subsurface formation containing a hydrocarbon reservoir using the interpretation;

producing hydrocarbons from the hydrocarbon reservoir.

BRIEF DESCRIPTION OF THE DRAWINGS

The invention will now be described in more detail and with reference to the accompanying drawings, wherein.

Where the same reference numerals are used in different Figures, they refer to the same or similar objects.

DETAILED DESCRIPTION OF THE INVENTION

Figure 1A:
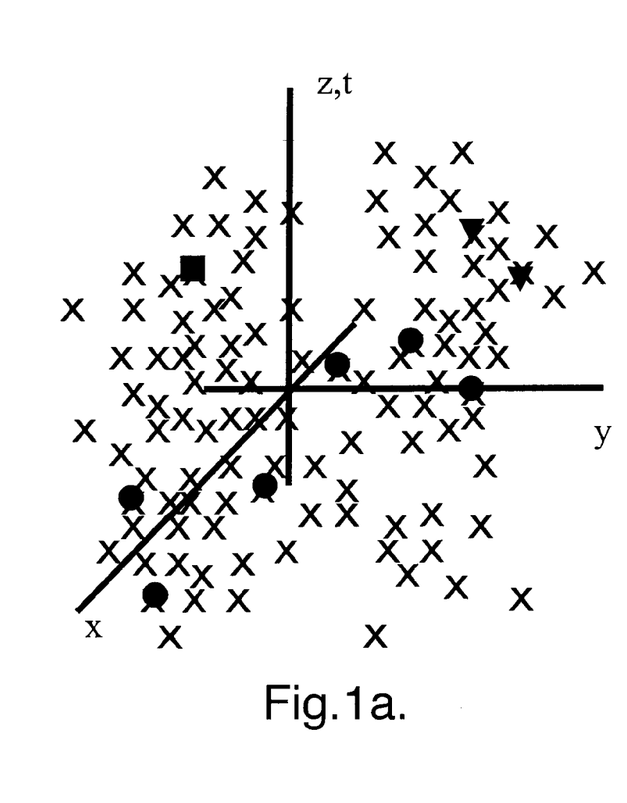
FIGS. 1a and 1b show schematically a 3-dimensional interpretation space and an attribute space, respectively, with data points (crosses) and classification points (filled symbols) indicated.
Figure 1B:
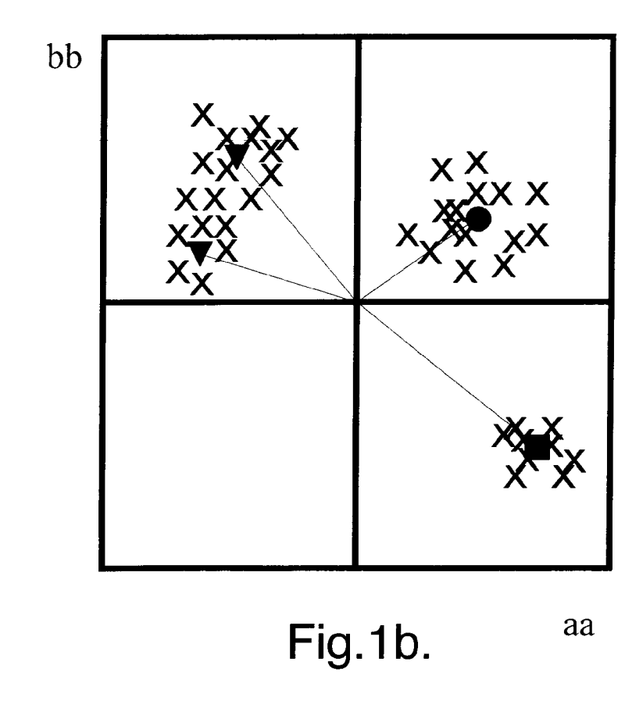

Reference is made to FIGS. 1a and 1b. FIG. 1a shows a 3-dimensional interpretation space, and for the purpose of illustration it will be assumed that it is a space in the earth's subsurface. So the three axes relate to co-ordinates x,y,z (spatial), or x,y,t, since the "vertical" dimension is frequently displayed in units of seismic travel time. The interpretation space can be any n-dimensional volume of a physical space. The interpretation space could also have for example two or one dimension(s), if data are obtained only in less than three dimensions such as in a plane or along a trajectory such as a wellbore.

For a large number of locations P in the interpretation space, where a cross is indicated in FIG. 1a, data are available or obtained, perhaps even continuously throughout the space. For the method of the invention, at least two data sets are considered, which can for example originate from different measurements, or from different parameters derived via processing of raw data from the same measurement(s). Each data set represents values of a specific attribute. The data can be available in any form, for example it can be stored in a computer's memory or on a mass storage medium, in different scalar data sets for the volume of interpretation space considered. It can also be stored as vector data, in which the individual vector components correspond to the various attributes.

Whatever the physical storage of data for the various attributes, to each of a plurality of locations in the interpretation space m attributes are assigned, which is considered assigning an attribute vector, having the m respective values of the attributes as components, to the respective locations. The attribute vectors typically represent data such as raw or processed physical data that are obtained or available for locations in the interpretation space. The crosses in FIG. 1a are to illustrate the attribute vector assigned to the respective location. In the present example we will consider the specific case of m=2 attributes, mainly for the ease of illustration, but 3 or more attributes can be handled in the same way. The two attributes considered are aa and bb, and examples are near- and far-offset reflectivity; lambda-rho and mu-rho; shear- and compressional-wave impedance; local amplitude envelope and semblance; local dip magnitude and azimuth; gravity-derived density and seismic-derived interval velocity.

FIG. 1b shows the two-dimensional attribute space having aa and bb as axes.

Attribute vectors assigned to locations P in the interpretation space are then arranged in attribute space. This can be all the attribute data available, or only part thereof. For example, only attribute vectors assigned to specific part or region of the interpretation space can be arranged in attribute space, such as from a slice from the 3-dimensional interpretation space. The crosses in FIG. 1b illustrate the attribute vectors arranged in attribute space.

In a next step, k classes of attribute vectors ($k \geq 2$) are defined. To this end, for each class at least one classification point is identified in attribute space. This is illustrated in FIG. 1b by the solid square, circle and triangles. These are shown taking the place of an ordinary cross, but this is not needed in general—a classification point can be defined in attribute space independent on the availability of actual data for that point. Experience from analysing geophysical data has shown that subsurface structures such as a particular lithology, fluid fill, facies, can often be characterized in attribute space by a certain region of attribute values. The practical difficulty is, however, how to determine the boundaries of such region.

For the purpose of illustration, FIG. 1b shows three well-separated clusters of attribute vectors, and each cluster contains one or more classification point(s) that define the classes. The selection of classification points for certain classes in attribute space can be based on, for example, the operator's observations of the data, or his understanding of the meaning of a region in attribute. It is important to note, however, that identification of classification points can also be done through interpretation space. If for example it is known to the operator that the location of the solid square in FIG. 1a is a type-case for a particular class of a subsurface feature, the attribute vector assigned to this location may be used to define that class. Such knowledge can for example come from log data available for that location. Another point to note is that several locations in interpretation space can happen to have the same attribute vector, as illustrated by the circles in FIGS. 1a and 1b. By selecting the point of the circle in attribute space, or one of the locations of the circles in interpretation space, all the other occurrences of the solid circle are likewise identified.

In the polygon method discussed in the Chopra article, the operator would now draw a polygon around each of the clusters to complete the classification. In more complicated cases than the illustrative example here, drawing a particular boundary may be misleading, since its location is highly subjective and uncertain. With the method of the present invention the uncertainty can be represented instead of ignored.

According to the present invention, a classification rule for points in attribute space is postulated. For the classification of a point in attribute space, a class-membership attribute is assigned to that classified point. The class-membership attribute is determined on the basis of the classification points and the classification rule.

The classification rule can take many forms. In a relatively straightforward embodiment, a point can be classified on the basis of the distance defined in attribute space from the classification points. For example, it can be taken to belong to the class of the nearest classification point.

Figure 2A:
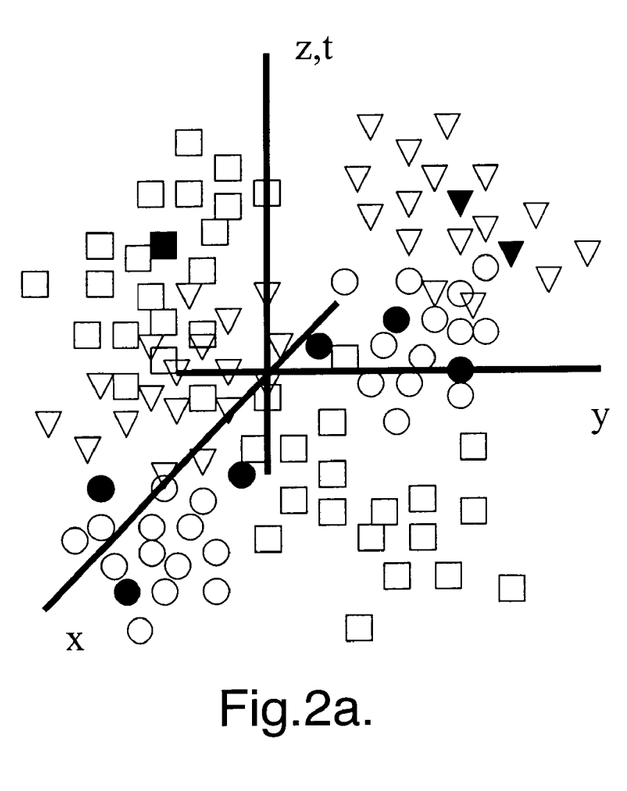
FIGS. 2a and 2b show schematically a 3-dimensional interpretation space and an attribute space, respectively, with classification points and classified points (open symbols) indicated.
Figure 2B:
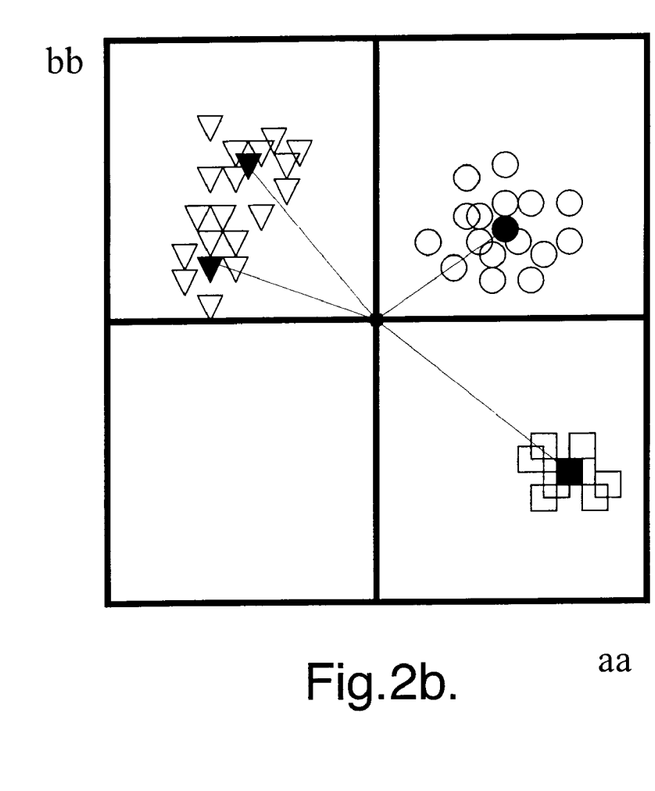

The result of such classification is shown in FIGS. 2a,b, wherein the attribute vectors at classified points (open symbols) in attribute space are assigned to the class of the nearest classification point (solid symbols).

In more sophisticated embodiments, one can work with probabilities. To this end a probability density function can be assigned to the class, describing the probability that a point in attribute space belongs to the given class as identified by the classification point(s) of that class. When such a probability density function is defined for each of the k classes, k probabilities can be determined for a classified point representing the likelihood of belonging to a selected one of the classes. Bayes' formula discussed below can be used in this process. The class-membership attribute can in such case comprise the plurality of fractional probabilities, e.g. in form of a vector of probabilities, having the dimension k for k classes.

A probability density function can assume many functional forms. A convenient approach is based on Gaussian functions, in particular a Gaussian Mixture Model also known as sum of Gaussians. With a mixture model any probability function can be represented with arbitrary accuracy (e.g. by increasing the number of classification points), and easily visualized, both conceptually and practically. The Mixture Model is easily generalized to other kernels than the Gaussian functions.

Formally, the conditional probability density function $p(a|c)$ for an attribute vector a to belong to class c can be denoted as $$p(a|c) = \sum_j w_j g_{\theta_j}(a)$$

wherein g designates a kernel density function such as a Gaussian function. Here, the class c is characterized by a weighted sum of Gaussians over the attribute space. The weights $w_j$ suitably sum to 1, and each can be interpreted as the prior probability associated with the j-th kernel. Parameters such as centroid and standard deviation of a Gaussian are symbolized by $\theta_j$.

Whatever functional form postulated for $p(a|c)$, Bayes' formula yields the "posterior" class-membership probability $p(c|a)$ for a given attribute vector a to belong to a particular class c of a set of classes $p(c|a)=p(a|c)p(c)/p(a)$, wherein $p(a)$ is a normalizing factor readily obtained by the summation of $p(a|c)p(c)$ over all classes c, and where $p(c)$ is the a priori probability to observe class c irrespective of the attribute value a or any available data, as presumed by the operator.

It is not necessary, nor even advisable in all circumstances, that the defined classes cover the entire classification space. In can be beneficial to include an "anything else" class, for example having a quasi-uniform probability density function and a prior probability selected as an a priori risk of encountering an unclassifiable point.

So far, we have assumed that the parameters of the probability density function are known and fixed by the operator. In many cases however, the operator has no such certainty and desires to estimate model parameters from any data available. After an initial selection, the classification is to be updated, if needed iteratively, to find a useful representation of the interpretation space.

Updating can be done manually by e.g. adapting the selection of classification points, the parameters such as Gaussian parameters assigned to one or more classes, or in fact the classification rules. A particular way to update more objectively is the so-called Expectation-Maximization (EM) algorithm, which is very generic—a special case being the so-called k-means clustering method—enabling a broad suite of statistical pattern recognition methods to be deployed in the framework of the present invention. The EM algorithm has some desirable mathematical properties; such has guaranteed convergence to likelihood maxima of the parameters being estimated. In combination with the (Gaussian) Mixture Model, it is also very efficient to implement and execute. Details can be found for instance in M. W. Mak, S. Y. Kung, S. H. Lin; "Expectation-Maximization Theory", Biometric Authentication: A Machine Learning Approach, Prentice-Hall, (2004). Another way is the K-means algorithm.

In a probabilistic classification, the classification points need not have a membership probability of 100% for the classes they indicate. Classification points can often also become classified points. They can, either initially or in an interactive classification step, be assigned a lower probability to belong to the class they indicate.

The selection of the classification points and the postulated classification rule determine the result of the classification. When fractional probabilities for a classified point have been determined, a "hard" classification can be obtained by e.g. assigning the point to the class with the highest (posterior) probability. The class-membership attribute then simplifies to a simple indicator of the class to which an attribute vector is assigned, similar to the classification according to the nearest classification point.

Figure 3A:
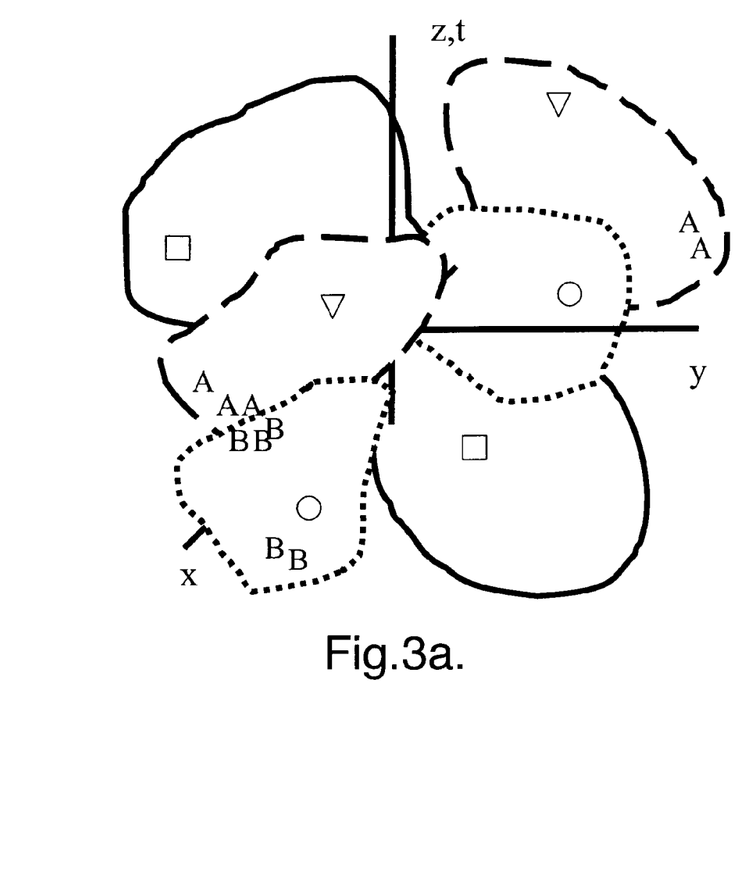
FIGS. 3a and 3b show schematically a 3-dimensional interpretation space and an attribute space, respectively, after a so-called "hard" classification, in which each attribute vector is assigned to belong entirely to only one of the several classes.
Figure 3B:
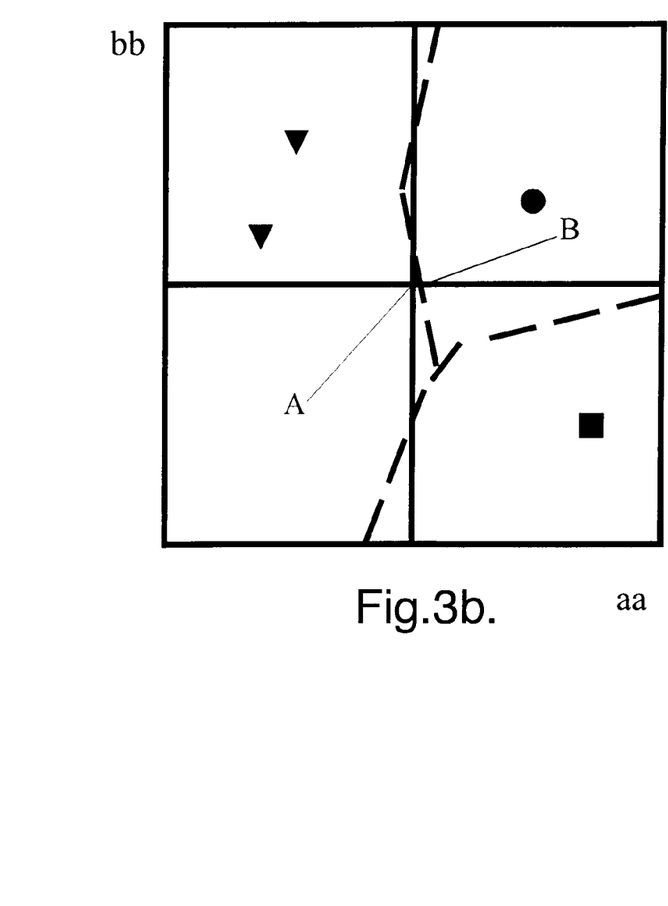

Such a hard classification divides the attribute space into zones, as illustrated in FIG. 3b. Dashed lines indicate zone boundaries, so that each attribute vector belongs to only one of the classes. If a location in interpretation space has an associated attribute vector, that vector belongs to one of the classes. Attribute vector A lies in the triangle class, vector B lies in the circle class, and each of both vectors is found at several locations in the interpretation space. For the sake of clarity, only a few characterizing points are shown in interpretation and attribute space. Note that the boundaries of classes obtained by such a classification are in general not plane surfaces or straight lines/polygons, but are typically curved. In interpretation space several regions can be distinguished in which attribute vectors of a particular class are found.

It is also possible to maintain the "soft" or "fuzzy" classification with a plurality of probabilities during further interpretation. Before this will be further discussed, we will first discuss the display parameter.

From the class-membership attribute of a point in attribute space a display parameter is derived for visualization of the classification result. In a hard classification, this can straightforwardly be obtained by assigning a specific colour to all attribute vectors of a given class. FIG. 3b can in this case be displayed as a map of three distinct colours with sharp boundaries between them, and the interpretation space is coloured accordingly.

In order to use the information available from a probabilistic or "soft" classification in the further interpretation, colour mixing can be used. To this end, selected colours are assigned to the classes or classification points, and other points are assigned a mixed colour derived from the fractional probabilities. A simple example is illustrated in FIGS. 4a,b.

An interpreter user has selected type cases G and B as classification points, has assigned labels "Green" and "Blue" to the associated classes, and has chosen functions to describe partial membership in the classes. In attribute space, vectors on the solid circles have equal membership in the Blue class, and smaller circles indicate a higher degree of membership in Blue. (Similarly the dashed circles represent fractional membership in Green. It shall be clear that circles are a simple example, and that in more complex probability density functions the isosurfaces or -lines of equal probability can and typically will have a different shape.) At point C, and elsewhere along the dotted line, membership is equally likely for Green and Blue. If the display parameter is colour, and Green and Blue are numerical representations of the colours with those names, then the display parameter assigned to C is the numerical representation of cyan. On a colour screen, the attribute space would be represented as a two-dimensional map with nearly pure blue and green at the respective points (note that even G and B need not be 100% members of the classes they indicate) and colours obtained from weighted mixing using the relative probabilities as weights everywhere. The dotted line would appear cyan. We note that the map is in general truly a general function of all the attributes, i.e. is not restricted to separable functions or linear combinations of one-dimensional colour bars.

Figure 4A:
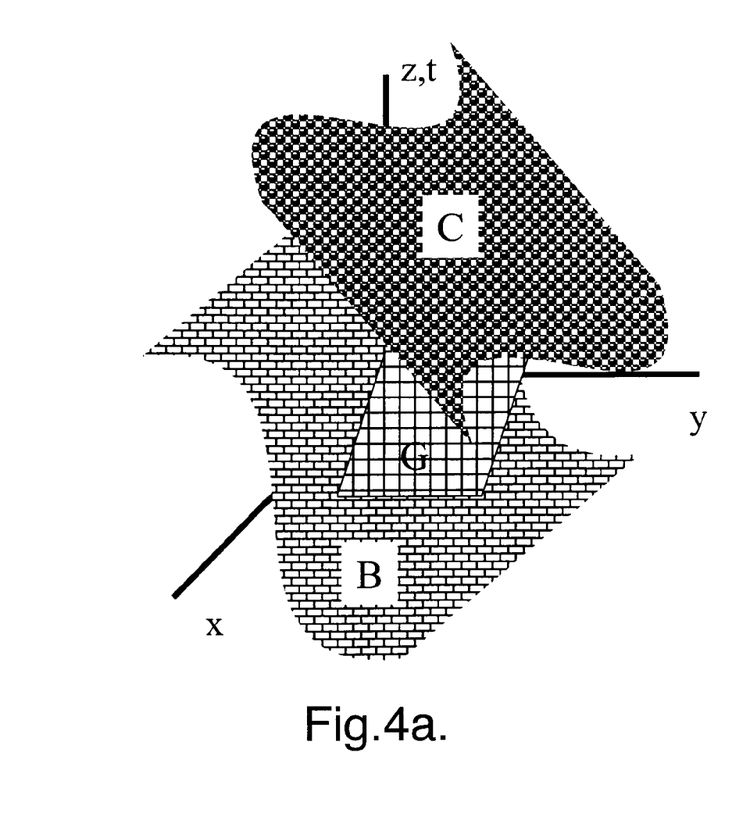
FIGS. 4a and 4b show schematically a 3-dimensional interpretation space and an attribute space, respectively, with probabilistic classification of the classes in the attribute space, in which each attribute vector may have partial membership in more than one class.
Figure 4B:
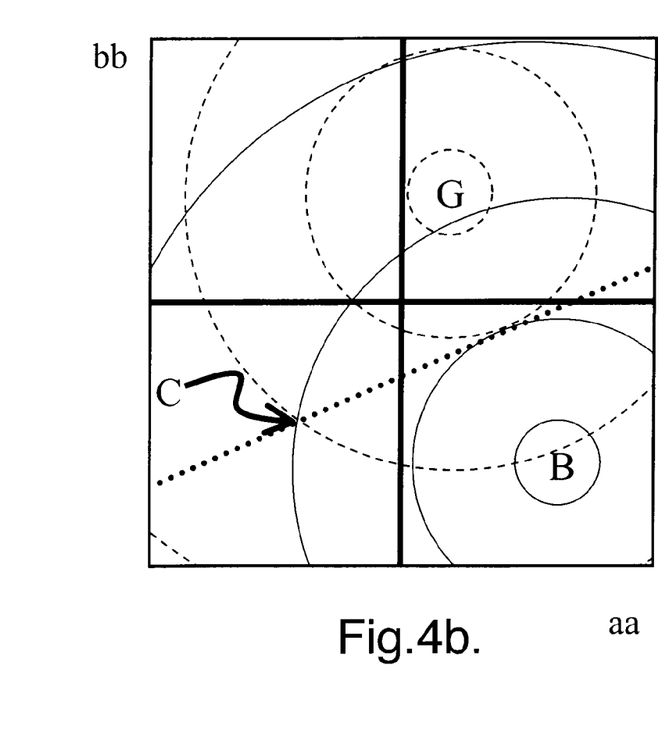

In the interpretation space of FIG. 4a, the interpreter can observe that several distinct features are apparent, displayed as blue (cross-hatched, "B"), green (bricked, "G"), and cyan (dotted, "C"). Other areas of the interpretation space will be coloured with intermediate colours (blended colours). A small deviation from the probabilities represented by a particular colour will be displayed with nearly that colour, so that a range of probabilities can easily be taken into account.

By assigning colour values representing class membership, in particular probabilistic class membership, to points in the attribute space, preferably covering all of the attribute space that is populated with actual attribute vectors, a two-dimensional colour map or table is defined. So the coloured attribute space represents a map or table that can be used as look-up reference for efficient display of the interpretation space.

Figure 5:
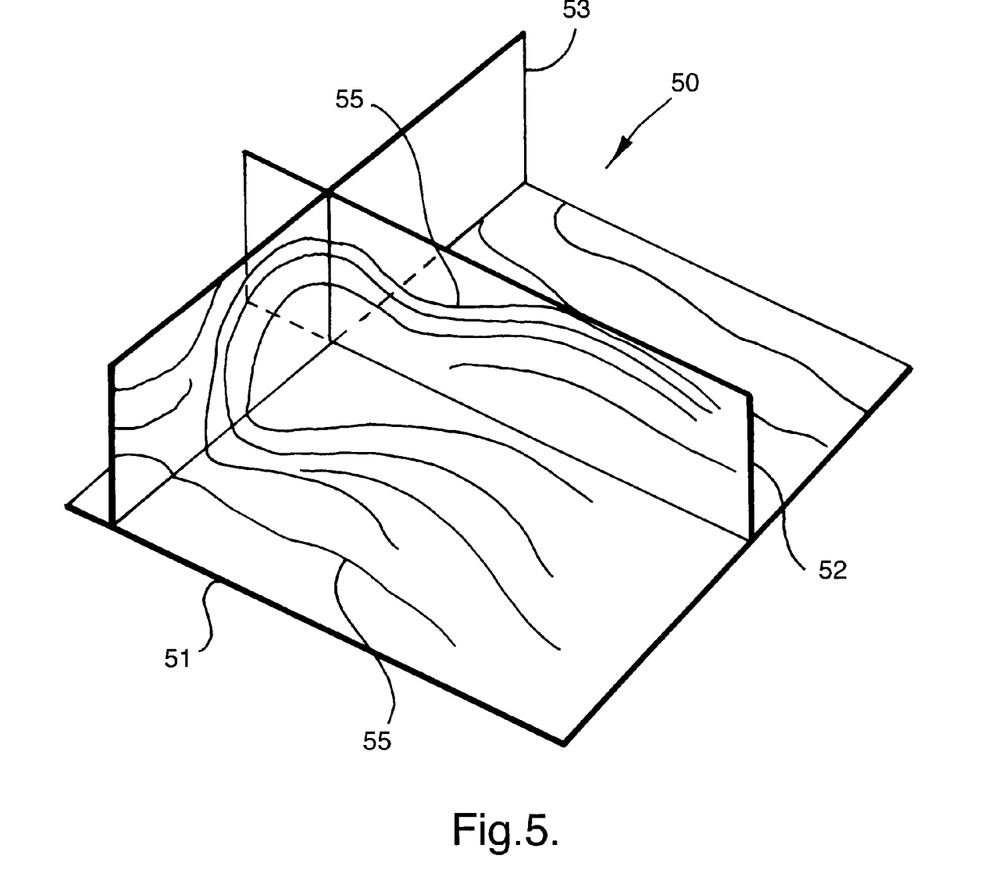
FIG. 5 shows a particular display of several cross-sections through a 3-dimensional interpretation space with events.

This is relevant since data volumes handled in seismic processing are significant. Typically, only a small part of the actual data is displayed at any one time on a computer's screen, such as shown in FIG. 5. With the map or table of display parameters obtained by the classification according to the present invention, changing the display of the interpretation space is merely a matter of a few lookup operations for each data point. For a given location in interpretation space 50, the several attributes are determined, and the corresponding display parameters (e.g. red, green, blue, transparency values) are read and used for displaying. These are fast operations allowing an operator to browse quickly through the data, e.g. by moving one of the slices or planes 51, 52, 53 in FIG. 5 using a standard workstation. The desired part of the interpretation space is then displayed and events 55 e.g. representing layers in a subsurface formation are highlighted using the colour map. It shall be clear that also other parts of the interpretation space can be displayed, e.g. isosurfaces or particular events. Given this speed of data handling and display, the classification effectively happens on the fly and can be interactively refined by the analyst in real time, suitably displaying attribute space (e.g. such as in FIG. 4b) and at least part of the interpretation space (e.g. as in FIG. 4a or 5) at the same time. Therefore, class definition (through attribute space) and display/interpretation (in interpretation space) are not separate, sequential steps anymore. Rather, these can be carried out simultaneously, by using the interactive manipulation of class membership parameters, e.g. through interactively changing the parameters of the probability density functions characterizing the classes.

The interpretation method of the present invention allows real-time interactivity in all operational aspects of the method, including the production of classified results, and thereby avoids the "black box" aspect of many state-of-the-art classification workflow.

Clearly, the same principles also allow effective handling of m=3 or more attributes, with colour cubes or hypercubes instead of two-dimensional colour maps. Such higher dimensional cubes can be created and handled principally in the same way as two-dimensional colour maps.

The interpretation according to the present invention can provide insight into the presence and properties of a subsurface formation. Sometimes it is possible to identify a region of the formation that contains a hydrocarbon reservoir, from which oil and/or natural gas can be produced, e.g. after drilling a well into the respective region of the subsurface.

The methods of the invention are suitably computer implemented, in particular by running a computer program product on a computer system. The computer program product comprises code suitable for carrying out the steps of the method. Clearly, this code can include prompting the user or operator of the method, such as a seismic interpreter, for input, such as for defining and/or updating classes, classification points and/or classification rules. When the classification is finalized, and/or at any intermediate stage, results (classification points, rules, class-membership attributes and/or display parameters) can be stored, displayed, outputted, or transmitted.

What is claimed is:

1. A method for interpreting a plurality of m-dimensional attribute vectors (m≧2) assigned to a plurality of locations in an n-dimensional interpretation space (n≧1), which method comprises the steps of
arranging at least a subset of the attribute vectors as points in an m-dimensional attribute space;
defining k classes (k≧2) of attribute vectors by identifying for each class at least one classification point in attribute space;
postulating a classification rule for points in attribute space;
determining a class-membership attribute of a point in attribute space using the classification points and the classification rule to obtain a classified point, wherein the class-membership attribute of the classified point comprises k probabilistic membership values, each representing a probability that the classified point belongs to a selected one of the k classes; and
assigning a display parameter to the classified point that is related to the class-membership attribute;
wherein the display parameter is a mixed display parameter derived from the probabilistic membership values.

2. The method according to claim 1, wherein defining a class comprises assigning a probability density function to the class, which is used in the classification rule to determine the class-membership attribute of the classified point.

3. The method according to claim 1, wherein at least one of the classification points is identified by selecting or identifying a location in the n-dimensional interpretation space.

4. The method according to claim 1, wherein the definition of classes is updated, in particular wherein updating is done by means of an algorithm such as Expectation-Maximization algorithm or K-means.

5. The method according to claim 1, wherein the step of defining k classes of attribute vectors includes assigning a colour to each class, and wherein the mixed display parameter is a mixed colour derived from the probabilistic membership values and the colours of the classes.

6. The method according to claim 1, wherein at least part of the interpretation space and/or attribute space is displayed using a k-dimensional attribute-to-colour map or table.

7. The method according to claim 1 wherein the method further comprises a step of displaying at least part of the attribute space together with displaying at least part of the interpretation space.

8. The method according to claim 7, wherein the definition of classes is updated in response to the displaying of the at least part of the attribute space together with the at least part of the interpretation space.

9. The method according to claim 1, wherein defining a class comprises defining a colour pertaining to that class.

10. The method according to claim 1 wherein the dimensions of the interpretation space are spatial dimensions, and optionally time, in particular wherein the n-dimensional interpretation space represents a subsurface formation.

11. The method according to claim 1, further comprising displaying the classified points in attribute space and at least in part of the interpretation space at the same time, using the mixed display parameter, on one or more computer displays.

12. A method for interpreting a plurality of m-dimensional attribute vectors ($m \geq 2$) assigned to a plurality of locations in an n-dimensional interpretation space ($n \geq 1$), which method comprises the steps of
arranging at least a subset of the attribute vectors as points in an m-dimensional attribute space;
defining k classes ($k \geq 2$) of attribute vectors by identifying for each class at least one classification point in attribute space;
postulating a classification rule for points in attribute space;
determining a class-membership attribute of a classified point in attribute space using the classification points and the classification rule;
assigning a display parameter to the classified point that is related to the class-membership attribute;
wherein the classified points are displayed in attribute space and at least in part of the interpretation space at the same time, using the display parameter, on one or more computer displays.

13. The method according to claim 12, wherein the class-membership attribute is determined from the location of the classified point with respect to the classification points.

14. The method according to claim 12, wherein at least one of the classification points is identified by selecting or identifying a location in the n-dimensional interpretation space.

15. The method according to claim 12, wherein the definition of classes is updated, in particular wherein updating is done by means of an algorithm such as Expectation-Maximization algorithm or K-means.

16. A computer program product for interpreting a plurality of m-dimensional attribute vectors ($m \geq 2$) assigned to a plurality of locations in an n-dimensional interpretation space ($n \geq 1$), which computer program product comprises
computer program code means for arranging at least a subset of the attribute vectors as points in an m-dimensional attribute space;
computer program code means for defining k classes ($k \geq 2$) of attribute vectors by identifying for each class at least one classification point in attribute space;
computer program code means for postulating a classification rule for points in attribute space;
computer program code means for determining a class-membership attribute of a point in attribute space using the classification points and the classification rule to obtain a classified point, wherein the class-membership attribute of the classified point comprises k probabilistic membership values, each representing a probability that the classified point belongs to a selected one of the k classes; and
computer program code means for assigning a display parameter to the classified point that is related to the class-membership attribute;
wherein the display parameter is a mixed display parameter derived from the probabilistic membership values.

17. A computer system executing the computer program products according to claim 16.

* * * * *